United States Patent Office 3,314,943
Patented Apr. 18, 1967

3,314,943
PREPARATION OF 6-KETO-Δ$^{5(10)}$-19-NOR STEROIDS
Albert Bowers and Otto Halpern, Mexico City, Mexico, assignors to Syntex Corporation, Panama, Panama, a corporation of Panama
No Drawing. Filed July 9, 1963, Ser. No. 293,891
8 Claims. (Cl. 260—239.55)

The present invention relates to a novel process for making cyclopentanoperhydrophenanthrene derivatives.

More particularly, the present invention relates to a process for making 6-keto-Δ$^{5(10)}$-19-nor steroids of the androstane, pregnane and sapogenin series from the corresponding 3-acyloxy-19-hydroxy-Δ$^5$-compounds.

The compounds obtained by the process of the present invention have good pharmacological properties, besides, they are valuable intermediates in the synthesis of numerous valuable ring A aromatic steroids or 19-nor compounds, which are well known therapeutic agents.

As set forth in copending application Ser. No. 236,724 filed on Nov. 9, 1962 now United States Patent 3,206,460, 6-keto-Δ$^{5(10)}$-19-nor androstanes are anabolic-androgenic compounds with a favorable anabolic-androgenic ratio in addition to having anti-gonadotrophic, anti-estrogenic, anti-fibrillatory and appetite stimulating properties. The 6-keto-Δ$^{5(10)}$-19-nor-21-desoxy pregnanes are progestational agents which also have anti-androgenoic, anti-estrogenic and anti-gonadotrophic properties. The 6-keto-Δ$^{5(10)}$-19-nor-21-hydroxy pregnanes are cortical hormones with anti-inflammatory activity. The 6-keto-Δ$^{5(10)}$-19-nor sapogenins produced by the novel method object of the invention are useful intermediates for the preparation of the 6-keto-Δ$^{5(10)}$-19-nor pregnanes by the conventional sapogenin side chain degradation. Thus, for example, the 3-acylate of Δ$^{5(10)}$-19-nor-22-isospirosten-3β-ol-6-one is reduced with lithium aluminum hydride, the sapogenin side chain is degraded by the usual procedure to produce 19-nor-Δ$^{5(10),16}$-pregnadien-3β,6-diol-20-one, the 17α-hydroxy group is introduced by the method of Julian, that is, epoxidation with alkaline hydrogen peroxide, the epoxide ring is opened with hydrogen bromide followed by debromination with Raney nickel to produce Δ$^{5(10)}$-19-nor-pregnene-3β,6β,17α-triol-20-one. Upon selective oxidation of the hydroxyl group at C–6 with manganese dioxide or 2,3-dichloro-5,6-dicyano-1,4-benzoquinone, there is formed Δ$^{5(10)}$-19-nor-pregnene-3β,17α-diol-6,20-dione. There can also be introduced a 21-acetoxy function in the latter compound by the method of Ringold et al. described in J. Amer. Chem. Soc. 80, 250 (1958). There can further be introduced an 11β-hydroxyl group via conventional microbiological hydroxylation.

In copending patent application Serial No. 236,724, filed on November 9, 1962, there was described a method for making Δ$^{5(10)}$-19-nor-6-keto steroids from 5α-bromo-6β,19-oxido-3-acyloxy compounds, which involves oxidation with chromium trioxide in aqueous acetic acid to produce the 16,19-lactone of the corresponding 5α-bromo-6β-hydroxy-19-oic acid, treatment of these acids with a strong base, preferably with a concentrated solution of potassium hydroxide in methanol to give rise to the corresponding 19-nor-Δ$^{5(10)}$-6α-hydroxy compounds, which upon oxidation with 2,3-dichloro-5,6-dicyano-1,4-benzoquinone are converted into the respective Δ$^{5(10)}$-19-nor-6-keto-3-hydroxy derivatives.

In accordance with the present invention, the surprising discovery has been made that when a 3-acyloxy-19-hydroxy-Δ$^5$-compound of the androstane, pregnane or sapogenin series is treated with an oxidation agent, preferably with a chromic acid derivative, for a prolonged period of time, there are produced, in one single step, the desired Δ$^{5(10)}$-19-nor-6-keto-3-acyloxy compounds in very good yields.

The novel method is illustrated by the following equation, wherein only rings A and B of the steroid molecule are represented:

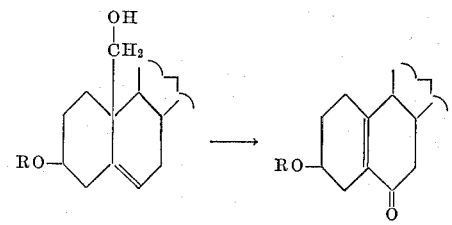

In the above formulas R represents an acyl radical of less than 12 carbon atoms; preferably the acetyl radical.

In practicing the process hereinbefore illustrated, a 19-hydroxy-3-acyloxy-Δ$^5$-steroid compound of the androstane, pregnane or sapogenin series (I) is treated with an oxidation agent, preferably with chromium trioxide in a suitable organic solvent, at room temperature and for a prolonged period of time, in the order of 24 hours to seven days, thus affording the corresponding Δ$^{5(10)}$-19-nor-6-keto-3-acyloxy compounds (II).

As it is well known in the art, oxidations with chromic acid are effected generally using as solvents aqueous acetic acid, pyridine (the chromium trioxide pyridine complex is formed) or acetone in the presence of sulfuric acid (Jones' oxidation). The best results are obtained by using the chromium trioxide pyridine complex, at room temperature and for a period of time of between 24 hous to seven days, preferably for 5 days. However, this reaction may be carried out for a shorter period of time, in the order of 3 to 6 hours, at higher temperatures, i.e., between 50 and 70° C. The process may also be accelerated by bubbling air or oxygen through the reaction mixture, for a period of time of 16 to 24 hours, at room temperature.

The reaction solution is filtered through celite to separate the inorganic material, and the filtrate is diluted with an organic solvent non-miscible with water, such as for example with ether, ethyl acetate, methylene dichloride, and the like. The organic solution is then washed with water to neutrality, and the product is isolated by the usual methods, preferably by direct crystallization or chromatography.

When the oxidation is carried out using Jones' reagent (8 N chromic acid solution in acetone and in the presence of sulfuric acid), the reaction mixture is kept at rooom temperature for 5 to 24 hours.

The conversion of 19-hydroxy-3-acyloxy-Δ$^5$-steroids into the corresponding Δ$^{5(10)}$-19-nor-6-keto-compounds may also be effected with sodium or potassium dichromate in mixture of benzene-acetic acid or in the presence of dilute sulfuric acid; however, lower yields are obtained.

Essentially, any 19-hydroxy-3-acyloxy-Δ$^5$-steroid containing from 19 to 27 carbon atoms in the molecule may be used as starting materials in the operation of the present invention. Thus, for example, at C–17 there may be present a keto group; a 17β-acyloxy group; a 17β-hydroxy group with or without an alkyl, alkenyl or alkinyl substituent at C–17α; a 17β-acetyl group with or without a hydroxy or acyloxy radical at C–17α; a dihydroxy acetone side chain preferably protected by a 17,20;20,21-bismethylenedioxy group, or a sapogenin side chain. At C–11 there may be present a keto group, at C–16 a keto group, a hydroxyl (acyloxy) group, an α or β methyl radical, a 16α,17α-acetonide group, etc.

The starting materials for the process of the present invention are obtained in accordance with U.S. Patent No. 3,065,228, by reaction of the 5α-bromo-6β,19-oxido compounds with zinc in ethanol or any other aliphatic lower alcohol solution.

Examples of suitable starting materials are: the 3,17-diacetate of $\Delta^5$-androstene-3β,17β,19-triol, the 3-acetate of 17α-methyl-$\Delta^5$-androstene-3β,17β,19-triol, the 3-acetate of 17α-vinyl-$\Delta^5$-androstene-3β,17β,19-triol, the 3-acetate of 17α-ethinyl-$\Delta^5$-androstene-3β,17β,19-triol, the 3-acetate of $\Delta^5$-pregnene-3β,19-diol-20-one, the 3-acetate of 16α-methyl-$\Delta^5$-pregnene-3β,19-diol-20-one, the 3,17-diacetate of 16β-methyl-$\Delta^5$-pregnene-3β,19-diol-20-one, the 3-acetate of 16α,17α - isopropylidenedioxy - $\Delta^5$ - pregnene - 3β, 19-diol-20-one, the 3,17-diacetate of $\Delta^5$-pregnene-3β,17α, 19-triol-20-one, the 3-acetate of 17,20;20,21-bismethylenedioxy-$\Delta^5$- pregnene-3β,19-diol, the 3-acetate of 17,20;20, 21-bismethylenedioxy-$\Delta^5$-pregnene-3β,19-diol-11-one, and the 3-acetate of 19-hydroxy diosgenin.

In the compounds possessing the dihydroxy acetone side chain protected by the bismethylenedioxy group, the protecting group may be eliminated by known methods, preferably by reaction with 60% formic acid.

The 3-acyloxy-$\Delta^{5(10)}$-6-keto-19-nor steroids obtained by the novel method may be saponified, and the free compounds thus obtained oxidized with 8 N chromic acid in acetone solution to the corresponding 3-ketone.

The follwoing specific examples serve to illustrate, but are not intended to limit the scope of the present invention:

PREPARATION 1

A solution of 5 g. of $\Delta^5$-androstene-3β,19-diol-17-one (described in U.S. Patent 3,065,228), in 250 cc. of benzene thiophene-free, was treated with 27.5 cc. of a 4 N solution of methyl magnesium bromide in ether and the mixture was refluxed for 3 hours in the absence of moisture. The cooled mixture was treated carefully with an excess of an aqueous solution of ammonium chloride and the product isolated by ethyl acetate extraction.

The extract was washed with water, died over anhydrous sodium sulfate and evaporated to dryness. Recrystallization of the residue from methylene chloride-hexane gave 17α-methyl-$\Delta^5$-androstene-3β,17β,19-triol.

In accordance with the foregoing procedure, but substituting methyl magnesium bromide by ethinyl magnesium bromide and vinyl magnesium bromide, $\Delta^5$-androstene-3β,19-diol-17-one gave respectively 17α-ethinyl-$\Delta^5$-androstene-3β,17β,19-triol-20-one and 17α-vinyl-$\Delta^5$-androstene-3β,17β,19-triol.

PREPARATION 2

A mixture of 3 g. of 17α-methyl-$\Delta^5$-androstene-3β,17β, 19-triol, 12 cc. of pyridine and 6 cc. of acetic anhydride was allowed to stand at room temperature overnight, poured into water and the formed precipitate collected by filtration, thus affording the 3,19-diacetate of 17α-methyl-$\Delta^5$-androstene-3β,17β,19-triol.

The foregoing crude diacetate was dissolved in 100 cc. of methanol, cooled to 0° C. and 500 mg. of potassium carbonate dissolved in 5 cc. of water were added. The reaction mixture was kept at 0° C. for 1 hour, neutralized with acetic acid and concentrated to a small volume, diluted with water and the formed precipitate filtered off. Recrystallization from acetone-hexane gave the 3-monoacetate of 17α-methyl-$\Delta^5$-androstene-3β,17β,19-triol.

In the same manner starting from 17α-vinyl-$\Delta^5$-androstene-3β,17β,19-triol and 17α-ethinyl-$\Delta^5$-androstene-3β-17β,19-triol there were obtained the corresponding 3-monoacetates.

PREPARATION 3

In accordance with the method described in the preceding preparation, 2 g. of 19-hydroxy diosgenin were converted into its 3-monoacetate, i.e., the 3-acetate of $\Delta^5$-22-isospirosten-3β,19-diol.

Example I

A solution of 2 g. of the 3,17-diacetate of $\Delta^5$-androstene-3β,17β,19-triol in 20 cc. of pyridine was added to a mixture of 2 g. of chromium trioxide in 20 cc. of pyridine. The reaction mixture was kept at room temperature for 7 days; at the end of this time it was diluted with ethyl acetate, filtered through celite and the filtrate washed well with water, dried and evaporated to dryness. The residue was crystallized from acetone-hexane to give the diacetate of $\Delta^{5(10)}$-19-nor-androstene-3β,17β-diol-6-one.

Example II

The preceding example was repeated, but the reaction mixture was allowed to stand for 5 days, to produce also the diacetate of $\Delta^{5(10)}$-19-nor-androstene-3β,17β-diol-6-one in similar yield.

Example III

A solution of 500 mg. of the 3,17-diacetate of $\Delta^5$-androstene-3β,17β,19-triol in 5 cc. of pyridine was added to a mixture of 500 mg. of chromium trioxide in 5 cc. of pyridine, and the reaction mixture heated on a water bath at 60° C. for 4 hours, under nitrogen atmosphere; it was then diluted with ethyl acetate, filtered through celite and the filtrate was washed well with water, dried, evaporated to dryness and crystallized from acetone-hexane, to produce also the diacetate of $\Delta^{5(10)}$-19-nor-androstene-3β, 17β-diol-6-one.

Example IV

Example I was repeated but the reaction mixture was kept for 24 hours only, to produce also the diacetate of $\Delta^{5(10)}$-19-nor-androstene-3β,17β-diol-6-one.

Example V

In accordance with the method described in Example I, the compounds below mentioned (I) were treated with chromic acid in pyridine, thus producing the compounds under II.

| I | II |
|---|---|
| 3-monoacetate of $\Delta^5$-pregnene-3β, 19-diol-20-one. | Acetate of $\Delta^{5(10)}$-19-nor-pregnen-3β-ol-6,20-dione. |
| 3-monoacetate of 16α-methyl-$\Delta^5$-pregnene-3β,19-diol-20-one. | Acetate of 16α-methyl-$\Delta^{5(10)}$-19-nor-pregnen-3β-ol-6,20-dione. |
| 3-monoacetate of 16β-methyl-$\Delta^5$-pregnene-3β,19-diol-20-one. | Acetate of 16β-methyl-$\Delta^{5(10)}$-19-nor-pregnen-3β-ol-6,20-dione. |
| 3-monoacetate of 16α,17α-isopropylidenedioxy-$\Delta^5$-pregnene-3β,19-diol-20-one. | Acetate of 16α,17α-isopropylidenedioxy-$\Delta^{5(10)}$-19-nor-pregnen-3β-ol-6,20-dione. |
| 3,17-diacetate of $\Delta^5$-pregnene-3β,17α,19-triol-20-one. | Diacetate of $\Delta^{5(10)}$-19-nor-pregnene-3β,17α-diol-6,20-dione. |
| 3-monoacetate of $\Delta^{5,16}$-pregnadiene-3β,19-diol-20-one. | Acetate of $\Delta^{5(10),16}$-19-nor-pregnadien-3β-ol-6,20-dione. |
| 3,17-diacetate of 16α-methyl-$\Delta^5$-pregnene-3β,17α,19-triol-20-one. | Diacetate of 16α-methyl-$\Delta^{5(10)}$-19-nor-pregnene-3β,17α-diol-6,20-dione. |
| 3-monoacetate of 17,20;20,21-bismethylenedioxy-$\Delta^5$-pregnene-3β,19-diol-11-one. | Acetate of 17,20;20,21-bismethylenedioxy-$\Delta^{5(10)}$-19-nor-pregnen-3β-ol-6,11-dione. |
| 3-monoacetate of 17,20;20,21-bismethylenedioxy-$\Delta^5$-pregnene-3β,19-diol. | Acetate of 17,20;20,21-bismethylenedioxy-$\Delta^{5(10)}$-19-nor-pregnen-3β-ol-6-one. |
| 3-monoacetate of $\Delta^5$-androstene-3β,19-diol-17-one. | Acetate of $\Delta^{5(10)}$-19-nor-androsten-3β-ol-6,17-dione. |
| 3-monoacetate of 17α-methyl-$\Delta^5$-androstene-3β,17β,19-triol. | 3-monoacetate of 17α-methyl-$\Delta^{5(10)}$-19-nor-androstene-3β,17β-diol-6-one. |
| 3-monoacetate of 17α-vinyl-$\Delta^5$-androstene-3β,17β,19-triol. | 3-monoacetate of 17α-vinyl-$\Delta^{5(10)}$-19-nor-androstene-3β,17β-diol-6-one. |
| 3-monoacetate of 17α-ethinyl-$\Delta^5$-androstene-3β,17β,19-triol. | 3-monoacetate of 17α-ethinyl-$\Delta^{5(10)}$-19-nor-androstene-3β,17β-diol-6-one. |
| 3-monoacetate of 19-hydroxy-diosgenin. | Acetate of $\Delta^{5(10)}$-19-nor-22-isospirosten-3β-ol-6-one. |

Example VI

A solution of 1 g. of chromium trioxide in 5 cc. of 80% acetic acid was added dropwise to a stirred solution of 1 g. of the 3,17-diacetate of $\Delta^5$-androstene-3β,17β, 19-triol in 10 cc. of glacial acetic acid while maintaining the temperature around 20° C. After 12 hours at room temperature the mixture was poured into ice water and the formed precipitate filtered off, washed with water and recrystallized from methanol, thus giving the diacetate of $\Delta^{5(10)}$-19-nor-androstene-3β,17β-diol-6-one.

*Example VII*

A solution of 1 g. of the 3-monoacetate of $\Delta^5$-pregnene-3β,19-diol-20-one in 20 cc. of acetone was cooled to 0° C., and then treated under nitrogen atmosphere and with stirring with an 8 N solution of chromic acid (prepared by mixing 26 g. of chromium trioxide with 23 cc. of concentrated sulfuric acid and dilution with water to 100 cc.) until the color of the reagent persisted in the mixture. It was stirred for 5 hours further at room temperature and diluted with water, extracted with methylene chloride and washed with water to neutrality, dried with anhydrous sodium sulfate and evaporated to dryness. The residue was chromatographed on 30 g. of washed alumina to produce the acetate of $\Delta^{5(10)}$-19-nor-pregnen-3β-ol-6,20-dione identical to that obtained by the method of Example V.

*Example VIII*

To a solution of 1.5 g. of the 3,17-diacetate of $\Delta^5$-androstene-3β,17β,19-triol in 50 cc. of benzene there was added dropwise 2 g. of sodium dichromate bihydrate dissolved in 50 cc. of acetic acid, while maintaining the temperature between 15–18° C., and the reaction mixture was allowed to stand at room temperature for 24 hours. It was then diluted with ether and washed with water to neutral, dried over anhydrous sodium sulfate and evaporated to dryness under reduced pressure. The residue was chromatographed on 50 g. of washed alumina to produce the diacetate of $\Delta^{5(10)}$-19-nor-androstene-3β,17β-diol-6-one, identical to that obtained in Example I.

*Example IX*

The preceding example was repeated but the reaction mixture was kept for 3 days at room temperature, to afford the same product.

*Example X*

Example VII was repeated but the reaction time was extended to 18 hours, to give the same product in similar yield.

*Example XI*

A solution of 1 g. of the 3-monoacetate of $\Delta^5$-pregnene-3β,19-diol-20-one in 10 cc. of pyridine was added to a mixture of 1 g. of chromium trioxide in 10 cc. of pyridine and the reaction mixture was heated at 40° C. under nitrogen atmosphere for 8 hours. The product was isolated in accordance with the technique described in Example I, to yield also the acetate of $\Delta^{5(10)}$-19-nor-pregnene 3β-ol-6,20-dione, identical to that obtained in the preceding examples.

*Example XII*

Example IV was repeated but bubbling constantly a stream of oxygen through the reaction mixture, to produce also the diacetate of $\Delta^{5(10)}$-19-nor-androstene-3β,17β-diol-6-one in similar yields.

In another experiment oxygen was substituted by a stream of air, with the same results.

*Example XIII*

One g. of the acetate of 17,20;20,21-bismethylenedioxy-$\Delta^{5(10)}$-19-nor-pregnen-3β-ol-6-one with 20 cc of 60% formic acid was heated on the steam bath for 1 hour, cooled, diluted with water and the formed precipitate collected by filtration, washed with water, dried and recrystallized from acetone-hexane thus yielding the 3-acetate of $\Delta^{5(10)}$ - 19 - nor - pregnene - 3β,17α,21 - triol-6,20-dione.

In the same manner, the acetate of 17,20;20,21-bismethylenedioxy - $\Delta^{5(10)}$ - 19 - nor - pregnen - 3β - ol-6,11-dione was converted into the 3-acetate of $\Delta^{5(10)}$-19-nor-pregnene-3β,17α,21-triol-6,11,20-trione.

We claim:

1. A process for the production of 3-acyloxy 6-keto-$\Delta^{5(10)}$-19-nor-steriods selected from the group consisting of the androstane, pregnane and sapogenin series which comprises reacting a 3-acyloxy-$\Delta^5$-19-hydroxy steroid selected from the group consisting of the androstane, pregnane and sapogenin series with an excess of an oxidation agent derived from chromic acid for at least 3 hours.

2. The process of claim 1 wherein the chromic acid derivative is the chromium trioxide pyridine complex.

3. The process of claim 1 wherein the oxidation agent is chromium trioxide in aqueous acetic acid.

4. The process of claim 1 wherein the oxidation agent is chromium trioxide in acetone-sulfuric acid solution.

5. The process of claim 1 wherein the oxidation agent is sodium dichromate.

6. The process of claim 2 wherein the reaction is effected at room temperature for a period of time in the order of 24 hours to 7 days.

7. The process of claim 2 wherein the reaction is conducted at a temperature higher than room temperature, for a period of time of between 4 and 24 hours.

8. The process of claim 2 wherein the reaction is accelerated by bubbling oxygen through the reaction mixture.

References Cited by the Examiner

UNITED STATES PATENTS 3,178,419 4/1965 Jeger et al. _____ 260—239.55
3,212,969 10/1965 Bowers _____ 167—58

OTHER REFERENCES

Fieser and Fieser: Steroids, N.Y., Reinhold, 1959, pages 202, 203, and 472.

Hagiwara et al: Chem. Pharm. Bull. (Tokyo), 8, pp. 84 and 85 (1960).

ELBERT L. ROBERTS, *Primary Examiner.*

T. M. MESHBESHER, *Assistant Examiner.*